(12) United States Patent
Manzari

(10) Patent No.: US 7,495,670 B1
(45) Date of Patent: Feb. 24, 2009

(54) SHAPES COMPRISING REPEATED GRAPHIC ELEMENTS

(76) Inventor: Johnnie Manzari, 1850 Clay St., #501, San Francisco, CA (US) 94109

( * ) Notice: Subject to any disclaimer, the term of this patent is extended or adjusted under 35 U.S.C. 154(b) by 545 days.

(21) Appl. No.: 11/107,265

(22) Filed: Apr. 15, 2005

(51) Int. Cl.
*G09G 5/00* (2006.01)
(52) U.S. Cl. .................. 345/588; 345/441; 345/443; 345/581
(58) Field of Classification Search ........ 345/441, 345/443, 581, 588
See application file for complete search history.

(56) References Cited

U.S. PATENT DOCUMENTS 5,239,596 A * 8/1993 Mahoney ............... 382/180
5,831,632 A 11/1998 Schuster et al.
6,975,425 B1 * 12/2005 Abe et al. ............. 358/1.18

OTHER PUBLICATIONS

Blum, H., "A Transformation for Extracting New Descriptors of a Shape", *Symposium on Models for the Perception of Speech and Visual Form*. Edited by W. Walthen-Denn. MIT Press, Cambridge, Massachusetts, pp. 362-380, 1967.
Mayya, N. and Rajan, V.T., "Voronoi Diagrams of Polygons: A Framework for Shape Representation", CVPR94, pp. 638-643, 1994.
Pavlidis, Theo, *"Algorithms for Graphics and Image Processing"*, Computer Science Press, Rockville, Maryland, 1982, (416 pp).

* cited by examiner

*Primary Examiner*—Kimbinh T Nguyen
(74) *Attorney, Agent, or Firm*—Berkeley Law and Technology Group, LLP

(57) ABSTRACT

Briefly, in accordance with one embodiment of the invention, a shape may comprise one or more repeated graphic elements.

31 Claims, 8 Drawing Sheets

SHAPES COMPRISING REPEATED GRAPHIC ELEMENTS

BACKGROUND

Software programs may be utilized to perform a variety of tasks using a computing platform such as a personal computer, a personal digital assistant and/or the like. One such task may be word processing using a word processor program with which a user may create, edit, and or/print typed documents using a keyboard to enter, manipulate, and/or edit text, a display to display the text, and/or a printer to print the text. The text entered, manipulated, and/or edited with such a word processor typically utilizes letters and/or characters represented with a given font, for example where the letters and/or characters are represented as a bit-mapped form. In contrast, another task may include graphics processing using a graphics package that may be utilized to create, edit, and or print graphic images. Such packages, while not being word processors, may allow a user to create and/or display stylized letters and/or characters. However, neither word processors nor graphics packages provide a user with the ability to fill shapes such as a rendered letterform with graphic shapes, and/or symbols as elements to represent the shapes.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
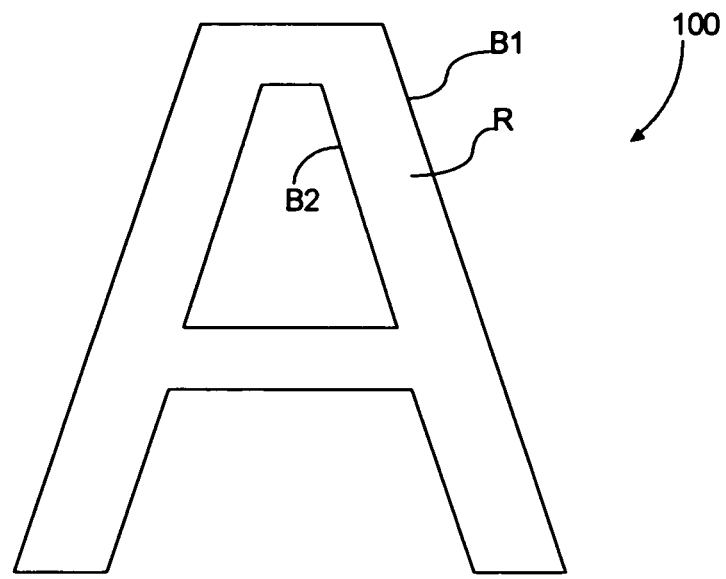
FIG. 1 is a diagram of a shape such as a letterform in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that the claimed subject matter may be practiced without these specific details. In other instances, well-known methods, procedures, components and/or circuits have not been described in detail.

Some portions of the detailed description that follows are presented in terms of algorithms, programs and/or symbolic representations of operations on data bits and/or binary digital signals within a computer memory, for example. These algorithmic descriptions and/or representations may include techniques used in the data processing arts to convey the arrangement of a computer system and/or other information handling system to operate according to such programs, algorithms, and/or symbolic representations of operations.

An algorithm may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It may be convenient at times, principally for reasons of common usage, to refer to these signals as bits, values, elements, symbols, characters, terms, numbers and/or the like. However, all of these and/or similar terms may be associated with the appropriate physical quantities, and are merely convenient labels applied to these quantities.

Unless specifically stated otherwise, as apparent from the following discussions, throughout the specification discussion utilizing terms such as processing, computing, calculating, determining, and/or the like, refer to the action and/or processes of a computer and/or computing system, and/or similar electronic computing device, that manipulate and/or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

Embodiments claimed may include apparatuses for performing the operations herein. This apparatus may be specially constructed for the desired purposes, or it may comprise a general purpose computing device selectively activated and/or reconfigured by a program stored in the device. Such a program may be stored on a storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device and/or other information handling system.

The processes and/or displays presented herein are not inherently related to any particular computing device and/or other apparatus. Various general purpose systems may be used with programs in accordance with the teachings herein, or a more specialized apparatus may be constructed to perform the desired method. The desired structure for a variety of these systems will appear from the description below. In addition, embodiments are not described with reference to any particular programming language. It will be appreciated that a variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term and/or may mean and, it may mean or, it may mean exclusive-or, it may mean one, it may mean some but not all, it may mean neither, and/or it may mean both, although the scope of the claimed subject matter is not limited in this respect.

In one or more embodiments, a shape may refer to a characteristic configuration, outline, contour, form and/or border of a thing or an object. Alternatively, a shape may be the thing or the object itself, for example something that is distinguished from its surroundings by its characteristic configuration, contour, form and/or border. In one or more embodiments, an object may refer to an item that may be selected and/or manipulated, for example shapes, pictures, and/or images that may appear on a display as rendered by a computing platform coupled to the display. In one or more embodiments, the term render may refer to displaying an object on a display coupled to a computing platform, and/or to manipulating the object on the display. In one or more embodiments, graphic may refer to a pictorial and/or image representation of an object, and in one or more alternative embodiments may refer to an object itself. In one or more embodiments, a graphic element may be single and/or fundamental graphic object, and/or a portion thereof. In one or more embodiments, a letterform may be a shape and/or design of a letter of an alphabet. In one or more embodiments, a font may refer to a design for a set of characters and/or letters for printing and/or displaying. In one or more embodiments, text may refer to letters and/or characters that may be manipulated and/or combined as words, lines, and/or pages. However, these are merely example definitions of the above terms, phrases, and/or concepts wherein other definitions may apply as well, and the scope of the claimed subject matter is not limited in this respect.

Referring now to FIG. 1, a diagram of a shape such as a letterform accordance with one or more embodiments will be discussed. As shown in FIG. 1, shape 100 may be defined at least in part as having one or more borders, B1 and/or B2. In one or more embodiments, shape 100 may comprise a letterform, for example capital letter A as shown in FIG. 1. In the letter A example of FIG. 1, shape 100 may include a first border, B1, and a second border, B2, that defines the form of shape 100. Such borders, B1 and B2, may be represented, for example, by graphical coordinates that define the form of shape 100. A set of coordinates, R, may be defined as being located within an interior of shape 100, for example being bounded by border B1 and border B2. In one embodiment, shape 100 may be a letterform of a font wherein a form of shape 100 may be defined by the font although the scope of the claimed subject matter is not limited in this respect.

Figure 2:
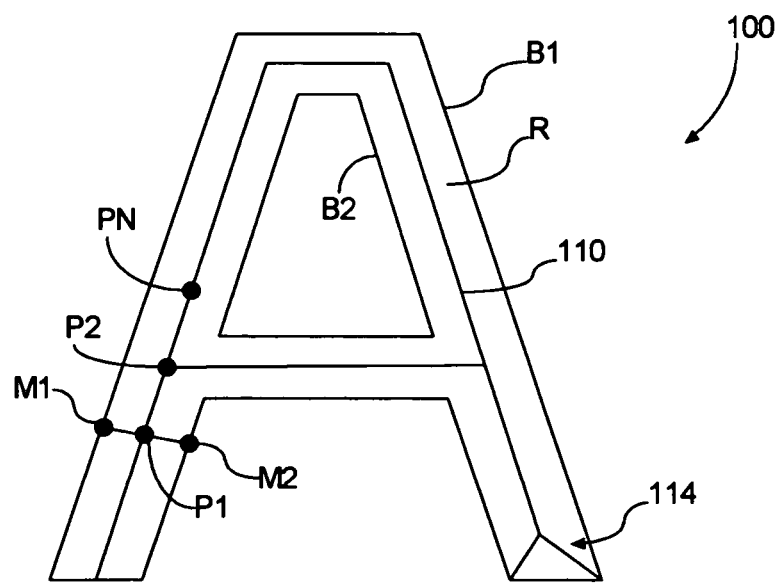
FIG. 2 is a diagram of a shape illustrating a medial axis of the shape in accordance with one or more embodiments.

FIG. 2 is a diagram of a shape illustrating a medial axis of the shape in accordance with one or more embodiments. In one embodiment, at least one medial axis 110 and/or two or more medial axes 110 may be defined as being disposed within border B1 and/or border B2 of shape 100. A medial axis may be defined as an axis of a shape that may be disposed at a middle and/or mean location within the shape, and may be considered generally as a spine of a shape. In one embodiment, medial axis 110 may be defined by a locus of points midway between border B1 and border B2. In one particular embodiment, a Pavlidis type formal definition of a medial axis may be utilized to determine medial axis 110. In such an embodiment, R may be a set of points located within boundary B1 and boundary B2. Points P1, P2, up to points PN, may be points located in R. Point P1 may be defined as a point nearby point M1 located on boundary B1 such that there is no other point on boundary B1 having a distance from P1 that is less than the distance P1M1 between medial axis point P1 and boundary point M1. If P1 has more than one nearest neighbor, for example boundary point M2 located on boundary B2, then P1 may be considered as being disposed on medial axis 110. Thus, the distance P1M1 may be equal to the distance P1M2, or approximately equal to the distance P1M2, for example where R comprises discrete-valued coordinates such as pixels on a display. Likewise, points P2 and PN may satisfy such a medial axis point definition. The union of all such medial axis points may define medial axis 110 of set of points R within shape 100. However, this is merely one example definition of a medial axis, and the scope of the claimed subject matter is not limited in this respect. In another embodiment, medial axis 110 may be defined by utilization of a Voronoi type diagram, and/or a variant thereof. In such an embodiment, a characterization of a two-dimensional shape may be determined. In such a determination, medial axis 110 may be defined, for example, as a set of points P1, P3, up to PN in R where for given points M1 and M2 on boundary B1 and/or boundary B2, point P1 may be simultaneously closer to M1 and to M2 than any other point in R. In one embodiment, an algorithm to determine medial axis 110 of shape 100 may be as follows. Insert points on a boundary such as boundary B1 and/or boundary B2. Draw a bisector line between two points. Draw additional bisector lines between a third point and the other two points nearest to the third point. The bisector lines define boundaries of Voronoi cells. Delete portions of bisector lines that extend into other cells. Continue this algorithm with additional points on boundary B1 and B2. The remaining portions of the bisector lines will define a set of points P1, P2, up to PN within R disposed on medial axis 110. An example of where medial axis 110 may be formed using a Voronoi type diagram is shown at 114. In one embodiment, a polygonal approximation of the boundaries of the Voronoi cells may be utilized to accommodate sharper changes in the curvature of boundaries B1 and/or B2. The deleting operation, above, may be accomplished by deleting two given Voronoi boundaries incident with vertices of the polygons. However, this is merely one example of how a Voronoi type diagram may be utilized to determine a medial axis of a shape, and the scope of the claimed subject matter is not limited in this respect.

Figure 3:
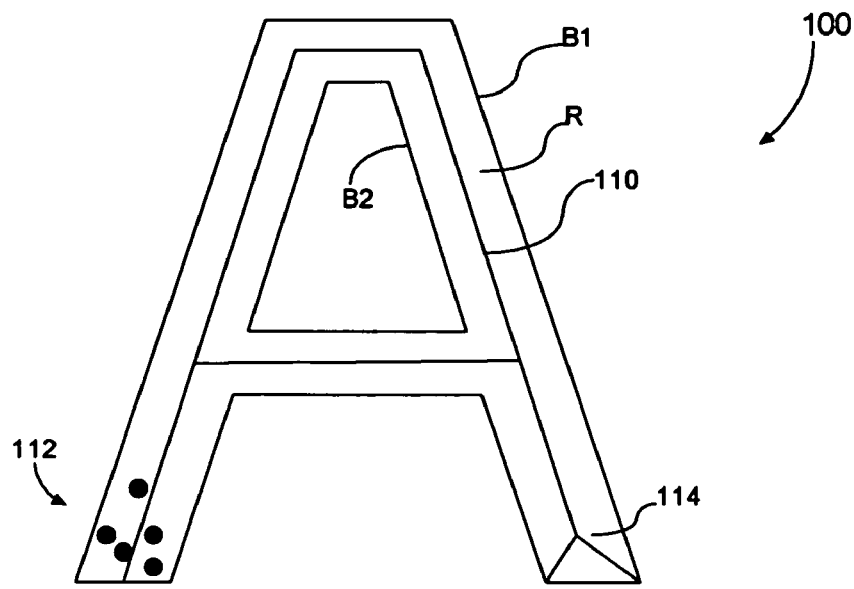
FIG. 3 is a diagram of a shape illustrating a placement of centers of repeated graphic elements in accordance with one or more embodiments.

Referring now to FIG. 3, a diagram of a shape illustrating a placement of centers of repeated graphic elements in accordance with one or more embodiments will be discussed. As shown in FIG. 3, in one embodiment, one or more centers 112 of a repeated graphic element may be disposed within R interior to boundary B1 and boundary B2 of shape 100. Graphic elements may be placed at locations within R such that the graphic elements have centers located at centers 112. Although such a portion of shape 100 is shown in FIG. 3, centers 112 may be disposed in R with respect to medial axis 110 for a portion and/or most and/or all of region R, although the scope of the claimed subject matter is not limited in this respect.

Figure 4:
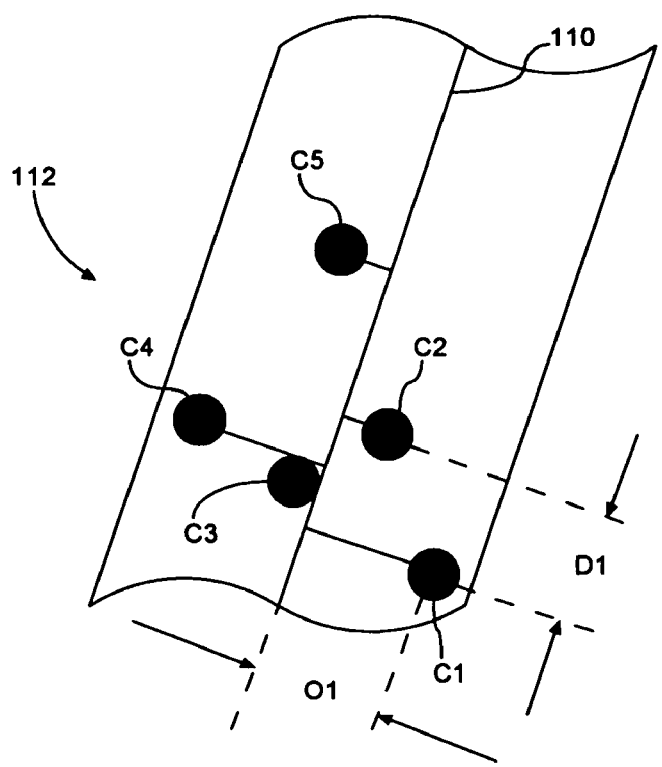
FIG. 4 is a diagram of a shape illustrating placement of centers of repeated graphic elements showing some details of the placement of the centers with respect to a medial axis of the shape in accordance with one or more embodiments.

Referring now to FIG. 4, a diagram of a shape illustrating placement of centers of repeated graphic elements showing some details of the placement of the centers with respect to a medial axis of the shape in accordance with one or more embodiments will be discussed. FIG. 4 show an enlarged view of a portion of shape 100 shown for example in FIG. 3. In one embodiment, centers 112 may be disposed with respect to medial axis 110 based on one or more parameters. Such parameters may include, for example, an offset distance of centers 112 from medial axis 110, and/or a separation distance between an adjacent center. For example, for centers, C1, C2, C3, C4 and/or C5, center C1 may be disposed at an offset distance O1 from medial axis 110. Similarly, center C2 may be disposed at a separation distance D1 from center C1. Such offset distances and/or separation distances may be selected by a user and/or predefined. For example, a given density of the graphic elements may be desired, and the offset distances and/or the separation distances may be based at least in part on the given density. Furthermore, the sizes of the graphic elements also may be based at least in part on the given density. In one embodiment, one or more of the parameters may be determined randomly and/or using a pseudorandom algorithm to determine one or more of the parameter values, although the scope of the claimed subject matter is not limited in this respect. When the graphic elements are placed at centers 112 in shape 100, one or more parameters may be selected, including but not limited to an offset distance from medial axis 110, a size of the graphical element, a density of the positions of centers 112 and/or of the graphical elements, opacity of the graphical elements, the type of the graphical element, an amount of rotation of the graphical element, a pattern of the graphical element, a position of the graphical elements border B1 and/or border B2 of shape 100, and/or an amount of overlap of the graphical elements with other graphic elements. However, these are merely examples of parameters that may be selected, and the scope of the claimed subject matter is not limited in this respect.

Figure 5:
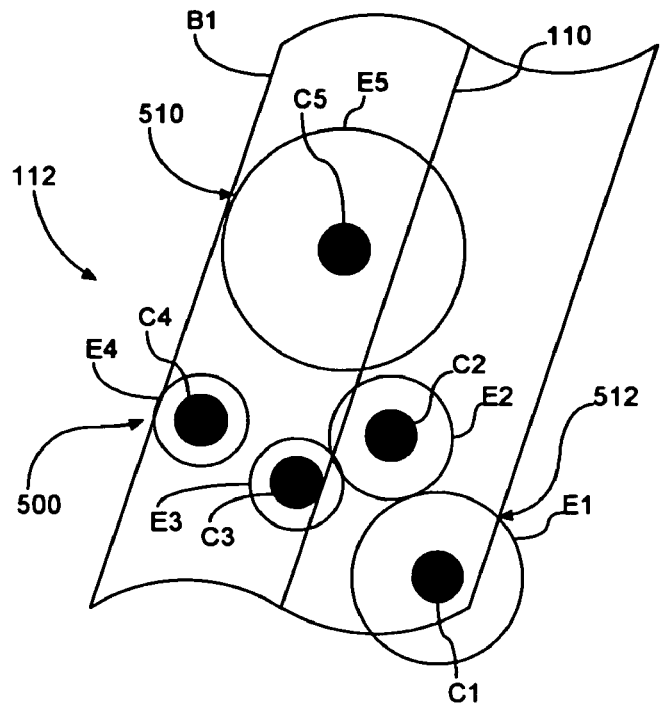
FIG. 5 is a diagram of a shape illustrating placement of centers of repeated graphic elements showing some details of the placement of the graphic elements in accordance with one or more embodiments.
Figure 6:
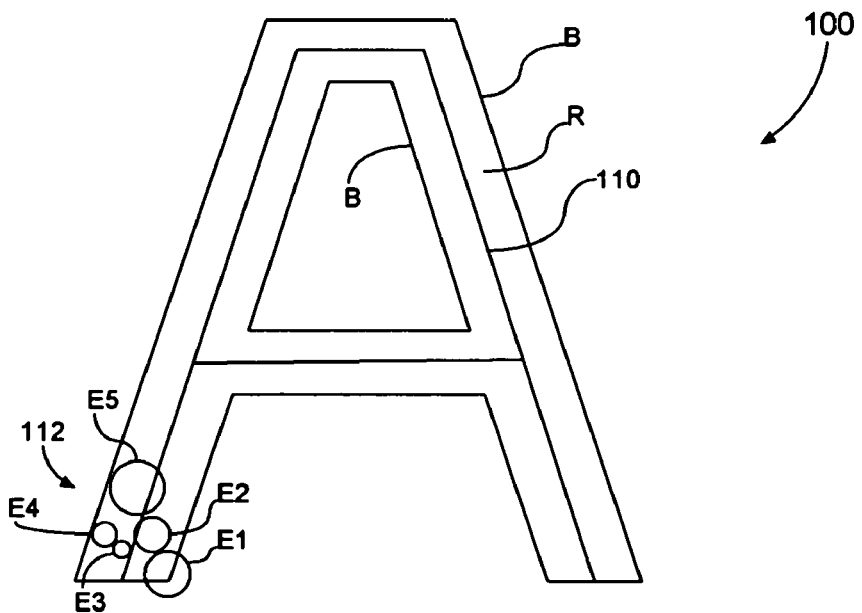
FIG. 6 is a diagram of a shape illustrating placement of the graphic elements in accordance with one or more embodiments.

Referring now to FIG. 5 and FIG. 6, a diagram of a shape illustrating placement of centers of repeated graphic elements showing some details of the placement of the graphic elements in accordance with one or more embodiments will be discussed. When the locations of centers 112 is determined, the graphic elements, for example graphic elements E1, E2, E3, E4, and/or E5, may be placed at repeated positions corresponding to centers 112 wherein the centers of graphic elements E1, E2, E3, E4, and/or E5 may correspond to centers C1, C2, C3, C4, and/or C5. In one embodiment, locations of centers 112 and/or the sizes of the graphic elements may be selected so that the borders graphic elements do not extend beyond boundary B1 and/or boundary B2 of shape 100, for example as shown at 500. In one particular embodiment, centers 112 and/or the sizes of the graphic elements are selected such that the entirety of the graphic elements are located within boundary B1 and/or boundary B2 wherein boundary B1 and/or boundary B2 does not cut-off and/or intersect with the graphic elements. In an alternative embodiment, the locations of centers 112 and/or the size of the graphic elements may allow for one or more graphic elements to extend at least in part beyond boundary B1 and/or boundary B2, for example as shown at 512. In one particular embodiment, centers 112 may disposed within boundary B1 and/or boundary B2, and in another embodiment at least some centers 112 may be disposed external to boundary B1 and/or boundary B2. However, these are merely examples of the locations of centers 112 and/or the graphic elements with respect to medial axis 110 and/or boundary B1 and/or boundary B2, and the scope of the claimed subject matter is not limited in this respect. In FIG. 6, placement of the graphic elements in accordance with one or more embodiments is shown where graphical elements E1, E2, E3, E4, and/or E5 are shown disposed having centers located at centers 112.

Figure 7:
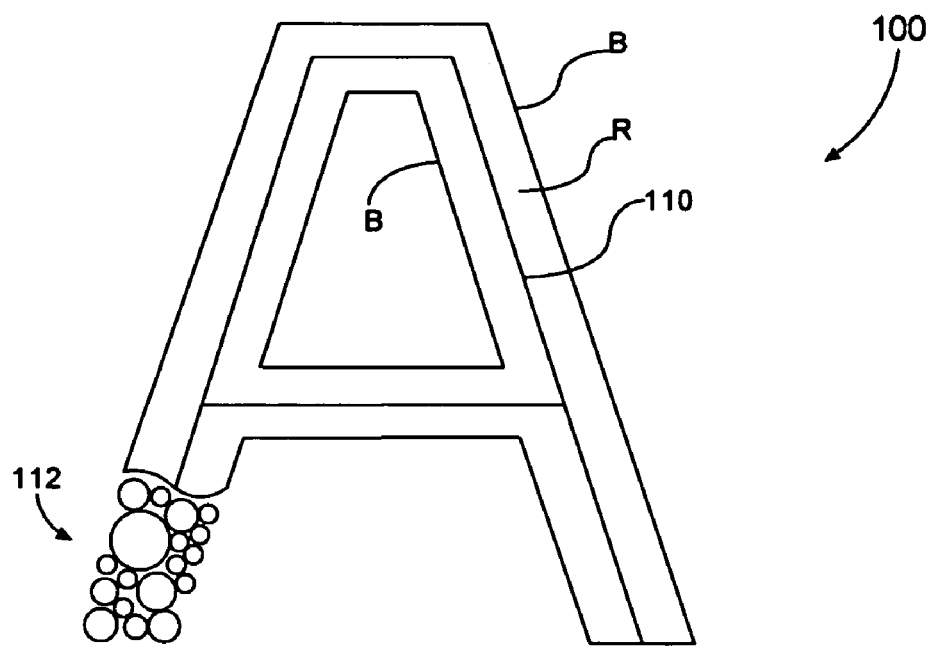
FIG. 7 is a diagram of a shape illustrating placement of graphic elements in comparison with a border of the shape in accordance with one or more embodiments.
Figure 8:
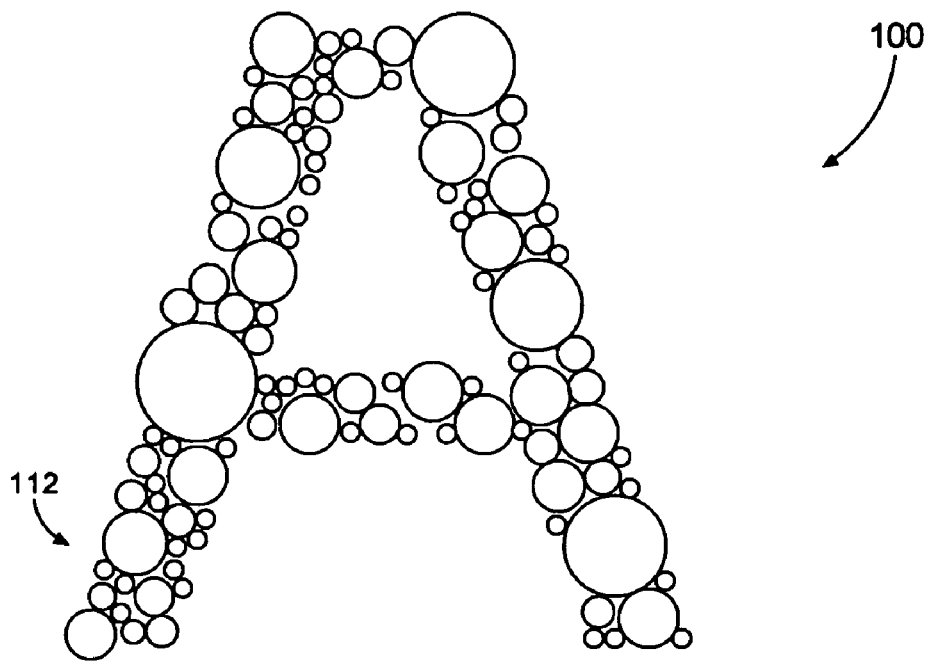
FIG. 8 is a diagram of a shape illustrating the placement of graphic elements wherein the medial axis and/or the border is hidden in accordance with one or more embodiments.

Referring now to FIG. 7 and FIG. 8, a diagram of a shape illustrating placement of graphic elements in comparison with a border of the shape in accordance with one or more embodiments will be discussed. As shown in FIG. 7, graphic elements may be disposed at locations corresponding to centers 112. Such graphic elements may generally follow along medial axis 110 and/or boundary B1 and/or boundary B2. In such an embodiment, the graphic elements generally define the shape of shape 100 when boundary B1 and/or boundary B2 are hidden and/or when medial axis 110 is hidden. A comparison between shape 100 when defined by boundary B1 and/or boundary B2 and/or medial axis 110, and shape 100 when defined by the graphic elements may be seen in FIG. 7 when a portion of shape 100 is shown with the graphic elements and a portion of shape 100 is shown with boundary B1, boundary B2 and medial axis 110. In FIG. 8, shape 100 is illustrated as being defined by the graphic elements when boundary B1, boundary B2, and/or medial axis 110 are hidden. As shown in FIG. 8, the shape of shape 100 may be depicted and ascertainable by the graphic elements, although the scope of the claimed subject matter is not limited in this respect. In one or more embodiments, characters and/or letters of a given type and/or font may comprise repeated graphic elements for a letterform such as the letter A represented by shape 100. Text may be written using such letterforms comprising repeated graphic elements. The text itself may be editable after filling one or more shapes 100 with repeated graphic elements wherein the repeated graphic elements may automatically fill shapes 100 for example as they are typed. However, this is merely one example of an application of a shape comprising repeated graphic elements, and the scope of the claimed subject matter is not limited in this respect.

Figure 9:
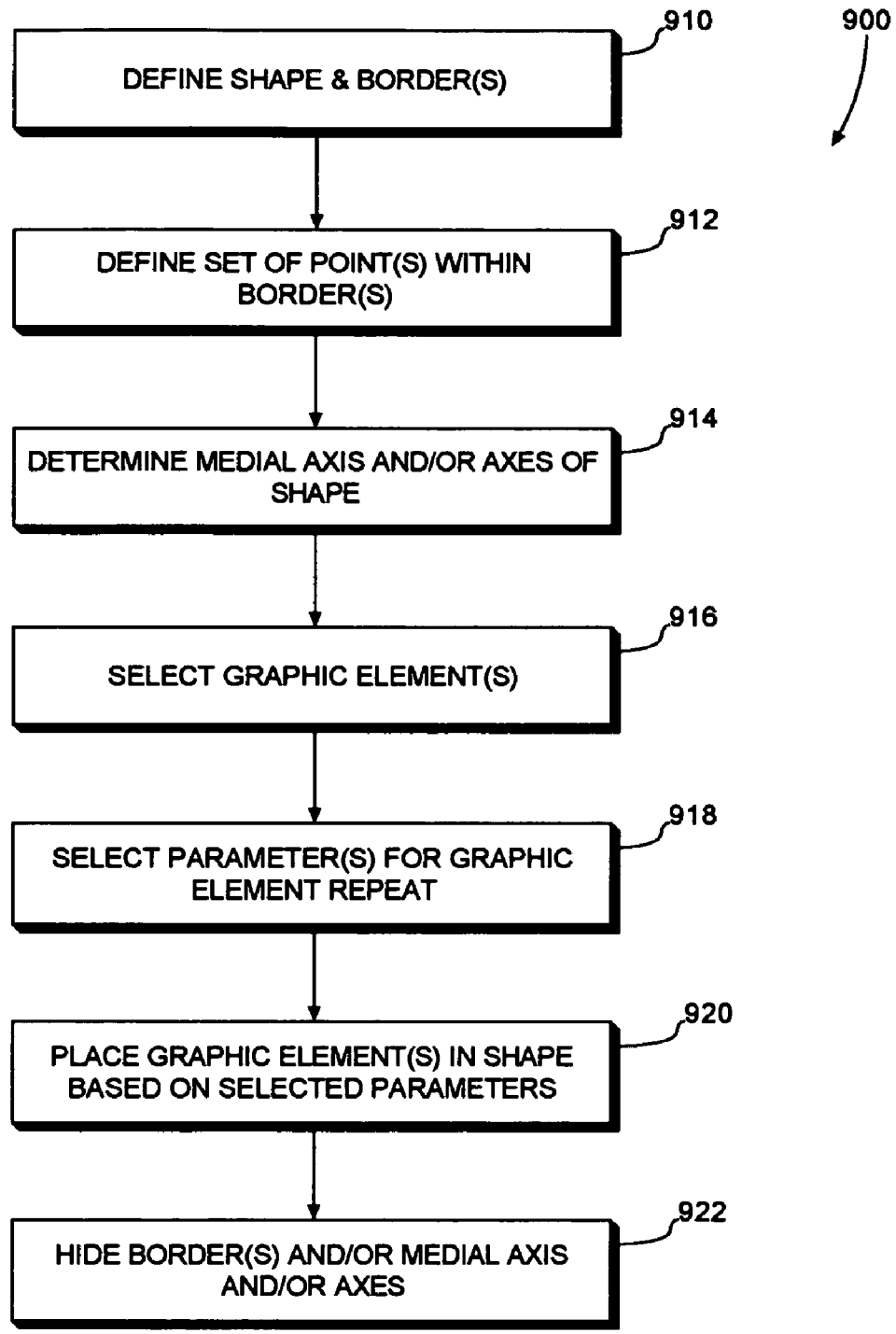
FIG. 9 is a flow diagram of a method for defining a shape comprising repeated graphic elements positioned at least in part with respect to a medial axis of the shape in accordance with one or more embodiments.

Referring now to FIG. 9, a flow diagram of a method for defining a shape comprising repeated graphic elements positioned at least in part with respect to a medial axis of the shape in accordance with one or more embodiments will be discussed. Method 900 may describe, for example, a method for defining a shape comprising one or more repeated graphic elements as shown in and described with respect to FIGS. 1-8. Method 900 may include all, more than all, and/or less than all of blocks 910-922 as shown in FIG. 9, and furthermore the order of blocks 910-922 is merely one particular order, and the scope of the claimed subject matter is not limited in this respect. At block 910, shape 100 may be defined including one or more borders B1 and/or B2 of shape 100. At block 912, a set of points R may be defined within one or more borders B1 and/or B2 of shape 100. In one embodiment, medial axis 110 and or multiple medial axes 110 of shape 100 may be determined at block 914, for example as discussed herein. One or more graphic elements may be selected at block 916 wherein shape 100 may comprise one or more repeats of the one or more graphic elements. Any graphic element may be selected, for example a shape, a picture, an image, a graphic, an object, a letter, a shape described by a mathematical algorithm such as, for example, a fractal, an oval, a circle, a square, a hyperbole, a cone, and/or the like. Furthermore, the graphic elements may be a representation of an n-dimensional object, for example a one-dimensional object, a two-dimensional object, a three-dimensional object, and/or the like. One or more parameters for the graphic element and/or elements may be selected at block 918 and may include one or more of the examples described herein, and in general may be any parameter for and/or describing a graphic object and/or image. One or more of the graphical elements may be placed in shape 100 at block 920 based at least in part on one or more of the selected parameters. Optionally, one or more of borders B1 and/or B2, and/or one or more of medial axes 112, may be hidden at block 922 wherein shape 100 may be represented by the graphic elements. However, method 900 is merely one example of a method for defining an object comprising one or more repeated graphic elements, and the scope of the claimed subject matter is not limited in this respect.

Figure 10:
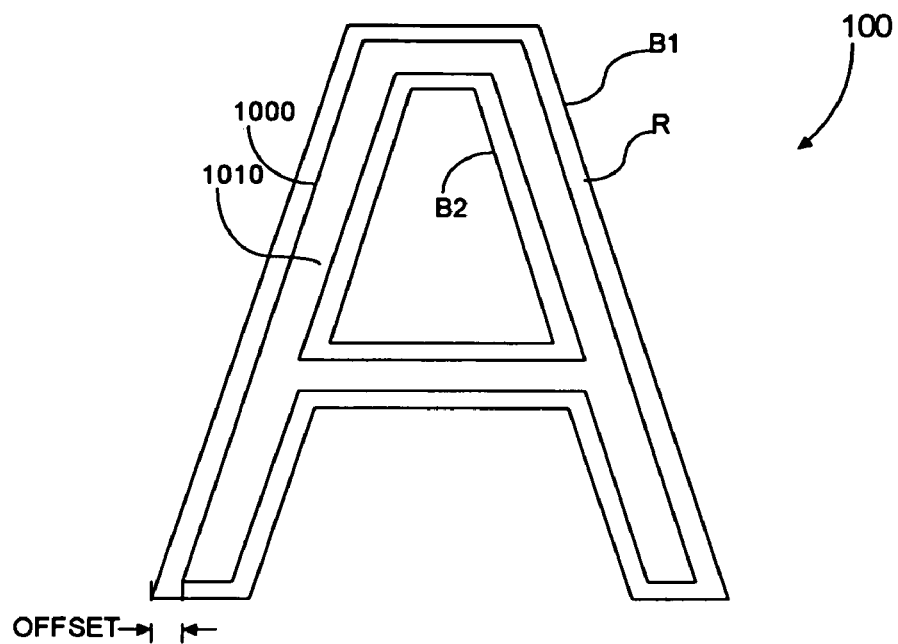
FIG. 10 is a diagram of a shape having one or more internal axes disposed at an offset from one or more borders of the shape in accordance with one or more embodiments.

Referring now to FIG. 10, a diagram of a shape having one or more internal axes disposed at an offset from one or more borders of the shape in accordance with one or more embodiments will be discussed. As shown in FIG. 10, shape 100 may have one or more internal axes in general, for example axis 1000 and/or axis 1010, and not necessarily medial axis 110 as shown for example in FIG. 2. In one embodiment, one or more of the internal axis and/or axes, such as axis 1000, may be disposed at an offset distance (OFFSET) from one or more of border B1 and/or border B2. In the example shown in FIG. 10, axis 1000 may be disposed at an offset distance from border B1 of shape 100. The offset distance may be a constant distance between border B1 and axis 1000, or alternatively the offset distance may vary at one or more different points in R. Likewise, axis 1010 may be disposed at a constant offset distance from border B2, or alternatively the distance may vary at one or more different points in R. However, axis 1000 and axis 1010 are merely example internal axes, and other internal axes may be defined at various other locations and using various other methods for defining an internal axis, and the scope of the claimed subject matter is not limited in this respect.

Figure 11:
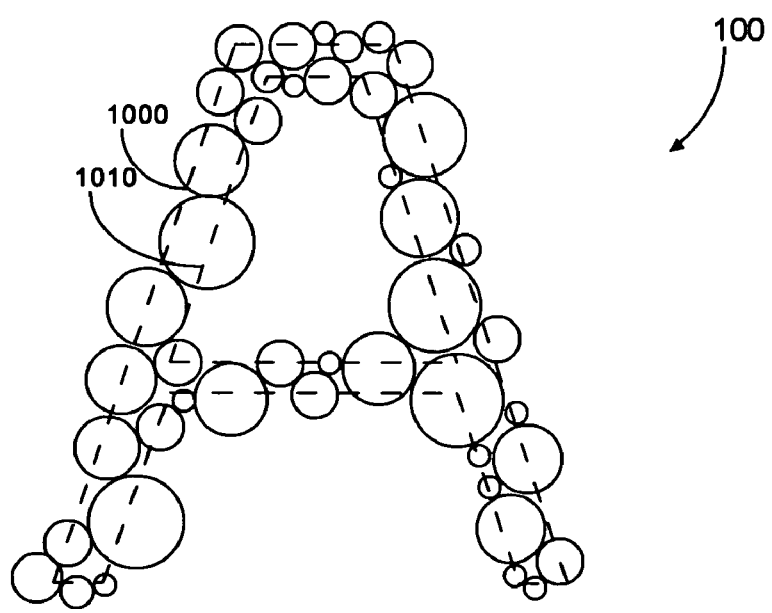
FIG. 11 is a diagram of a shape having one or more internal axes disposed at an offset from one or more borders of the shape illustrating repeated graphic elements disposed with respect to the one or more internal axes.

Referring now to FIG. 11, a diagram of a shape having one or more internal axes disposed at an offset from one or more borders of the shape illustrating repeated graphic elements disposed with respect to the one or more internal axes will be discussed. Shape 100 of FIG. 11 shows shape 100 of FIG. 8 with border B1 and/or border B2 hidden. Internal axis 1000 and internal axis 1010 are shown as dashed lines. Shape 100 may comprise one or more repeated graphic elements, for example as shown in and described with respect to FIGS. 1-9, wherein shape 100 may include determined axis 1000 and/or axis 1010 rather than medial axis 112. One or more graphic elements may be disposed with respect to one or more of axis 1000 and/or axis 1010 as show in FIG. 10, for example in a manner as show in and described with respect to FIGS. 3-8. A version of shape 100 based at least in part on one or more of axis 1000 and/or axis 1010 may be defined by hiding one or more of border B1, border B2, and/or axis 1000 and/or axis 1010 wherein shape 100 of FIG. 11 may comprise one or more repeated graphic elements similar to shape 100 shown in FIG. 8. However, this is merely one example of how shape 100 may comprise one or more repeated graphic elements wherein the graphic elements may be disposed with respect to one or more internal axes such as axis 1000 and/or axis 1010, and the scope of the claimed subject matter is not limited in this respect.

Figure 12:
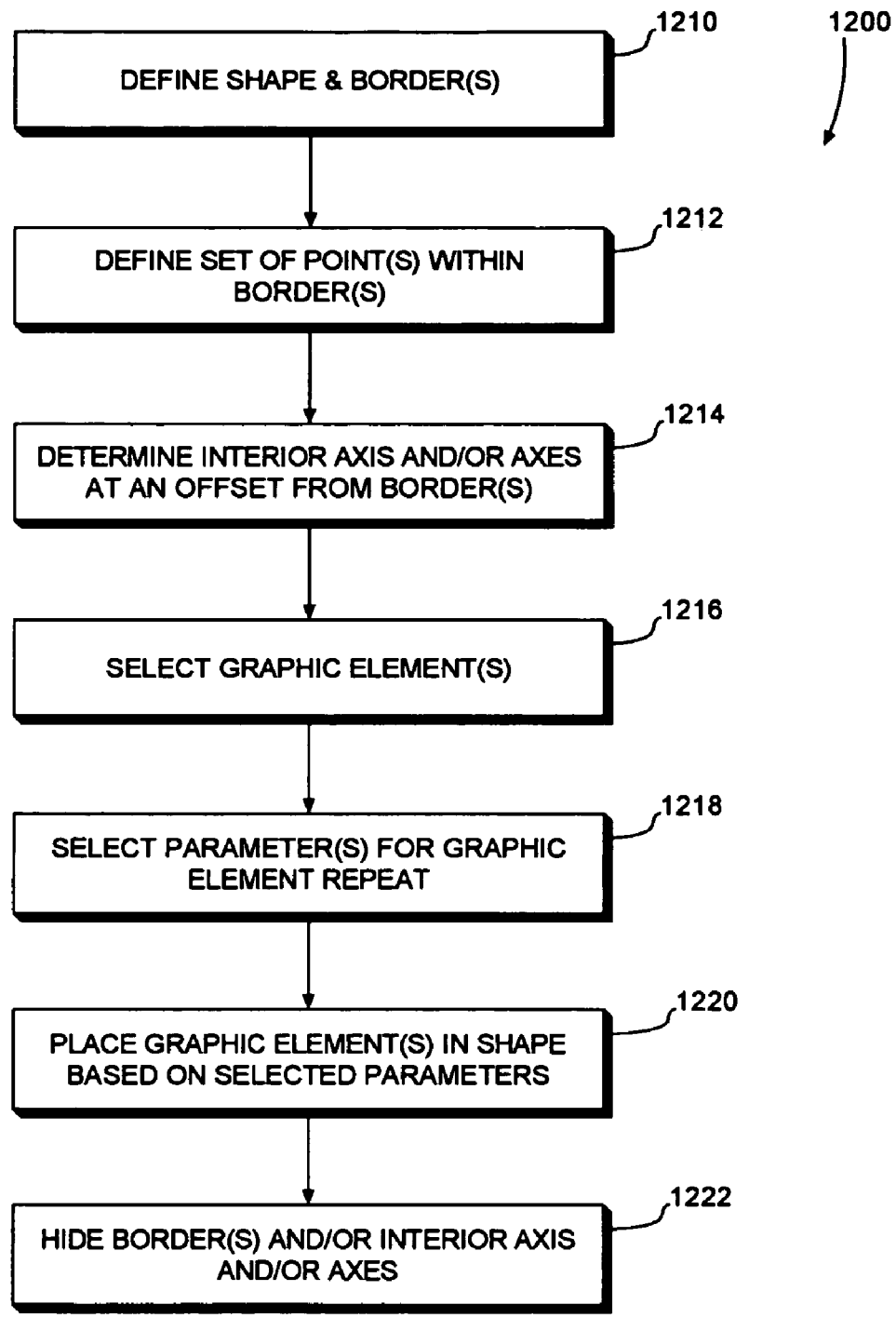
FIG. 12 is a flow diagram of a method for defining a shape comprising repeated graphic elements positioned at least in part with respect to one or more internal axes disposed at an offset from one or more borders of the shape in accordance with one or more embodiments.

Referring now to FIG. 12, a flow diagram of a method for defining a shape comprising repeated graphic elements positioned at least in part with respect to one or more internal axes disposed at an offset from one or more borders of the shape in accordance with one or more embodiments will be discussed. Method 900 may describe, for example, a method for defining a shape comprising one or more repeated graphic elements as shown in and described with respect to FIGS. 1-8. Method 1200 may include all, more than all, and/or less than all of blocks 1210-1222 as shown in FIG. 12, and furthermore the order of blocks 1210-1222 is merely one particular order, and the scope of the claimed subject matter is not limited in this respect. At block 1210, shape 100 may be defined including one or more borders B1 and/or B2 of shape 100. At block 1212, a set of points R may be defined within one or more borders B1 and/or B2 of shape 100. In one embodiment, one or more internal axes of shape 100, such as axis 1000 and/or axis 1010, may be determined at block 1214, for example as discussed herein. One or more graphic elements may be selected at block 1216 wherein shape 100 may comprise one or more repeats of the one or more graphic elements. Any graphic element may be selected, for example a shape, a picture, an image, a graphic, an object, a letter, a shape described by a mathematical algorithm such as, for example, a fractal, an oval, a circle, a square, a hyperbole, a cone, and/or the like. Furthermore, the graphic elements may be a representation of an n-dimensional object, for example a one-dimensional object, a two-dimensional object, a three-dimensional object, and/or the like. One or more parameters for the graphic element and/or elements may be selected at block 1218 and may include one or more of the examples described herein, and in general may be any parameter for and/or describing a graphic object and/or image. One or more of the graphical elements may be placed in shape 100 at block 1220 based at least in part on one or more of the selected parameters. Optionally, one or more of borders B1 and/or B2, and/or one or more of internal axes such as axis 1000 and/or axis 1010, may be hidden at block 1222 wherein shape 100 may be represented by the graphic elements. However, method 1200 is merely one example of a method for defining an object comprising one or more repeated graphic elements, and the scope of the claimed subject matter is not limited in this respect.

Figure 13:
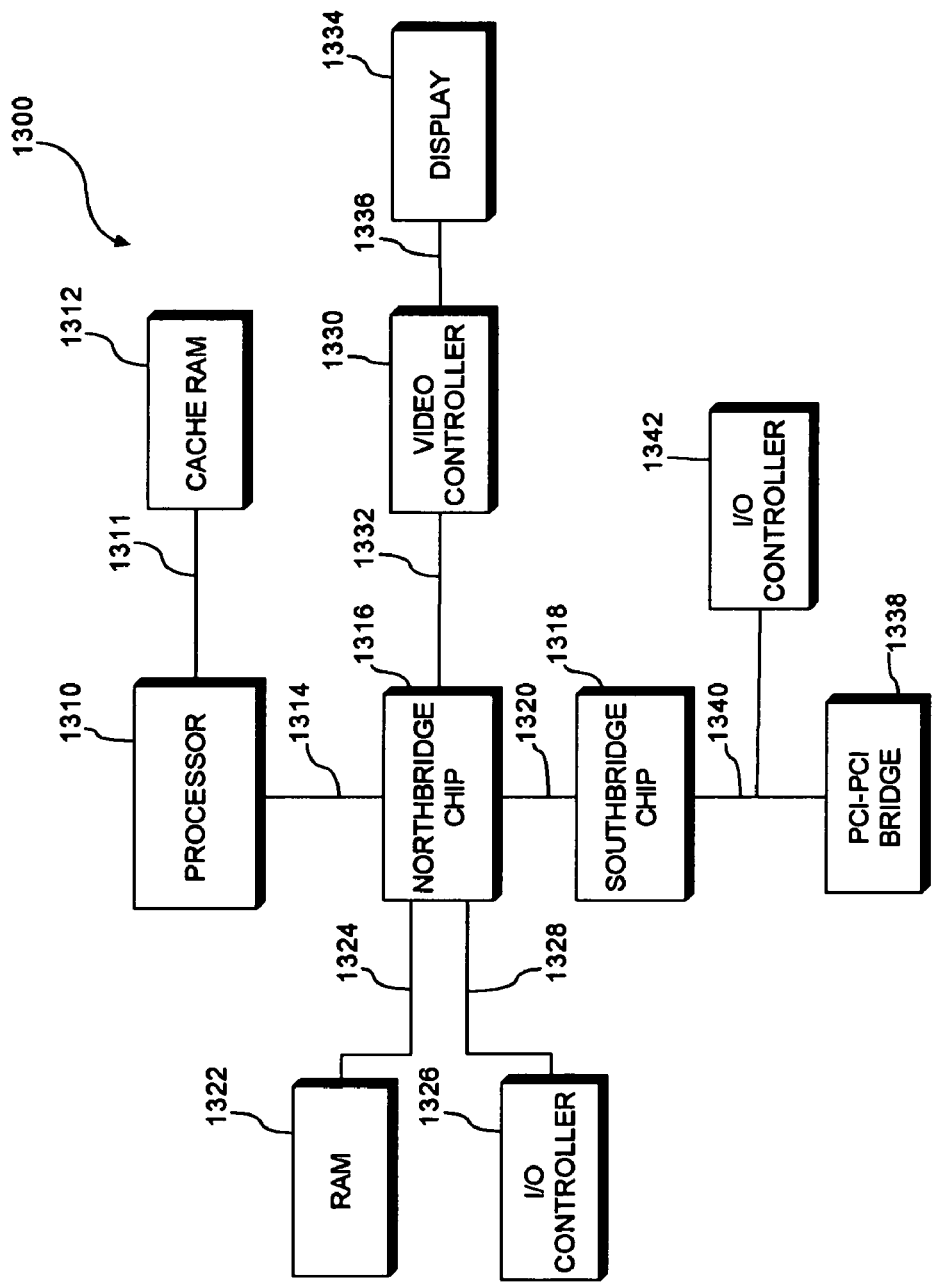
FIG. 13 is a block diagram of a computing platform in accordance with one or more embodiments.

Referring now to FIG. 13, a block diagram of a computing platform in accordance with one or more embodiments will be discussed. Computing platform 1300 may be programmed to determine a shape such as shape 100 comprising one or more repeated graphic elements. For example, computing platform 1300 may run a software program such as Adobe® Illustrator® available from Adobe Systems Incorporated of San Jose, Calif., USA, that may determine a shape 100 comprising one or more repeated elements, for example a letterform displayed on a display coupled to computing platform 1300, although the scope of the claimed subject matter is not limited in this respect. Computing platform 1300 may include processor 1310 coupled to cache random access memory (RAM) 1312 via back side bus 1311. Processor 1310 may also couple to a chipset that includes Northbridge chip 1316 via front side bus 1314, and also to Southbridge chip 1-318 via bus 1320. In one embodiment, Northbridge chip 1316 in general may be utilized to connect a processor to memory, to an input/output bus, to a video bus, and to Level 2 cache, although the scope of the claimed subject matter is not limited in this respect. In one embodiment, Southbridge chip 1318 may be utilized to control input/output functions, the basic input/out system (BIOS), an interrupt control functions of Integrated Drive Electronics (IDE) devices such as hard disks or compact disk-read only memory (CD-ROM) devices or the like, although the scope of the claimed subject matter is not limited in this respect. Random access memory (RAM) 1322 may couple to Northbridge chip 1316 via main memory bus 1324, and input/output (I/O) controller 1326 may also couple to Northbridge chip 1316 via I/O bus 1328. In one embodiment, I/O controller 1326 and I/O bus 1328 may be in compliance with a Small Computer Systems Interface (SCSI) specification such as the American National Standards Institute (ANSI) X3.131-1994 SCSI-2 specification, although the scope of the claimed subject matter is not limited in this respect. In an alternative embodiment, I/O controller 1326 and I/O bus 1328 may be in compliance with a Peripheral Component Interconnect (PCI) bus, although the scope of the claimed subject matter is not limited in this respect.

Video controller 1330 may couple to Northbridge chip 1316 via video bus 1332 which in one embodiment may comprise an Accelerated Graphics Port (AGP) bus, although the scope of the claimed subject matter is not limited in this respect. Video controller 1330 may provide video signals to and optionally coupled display 1334 via display interface 1336 which in one embodiment may comprise a Digital Visual Interface (DVI) in compliance with a standard promulgated by the Digital Display Working Group, although the scope of the claimed subject matter is not limited in this respect. Southbridge chip 1318 may couple to a peripheral component interconnect to peripheral component interconnect (PCI-PCI) bridge 1338 via input/output bus 1340, which may in turn couple to I/O controller 1342 to control various peripheral devices such as Universal Serial Bus (USB) devices, or devices compatible with an Institute of Electrical and Electronics Engineers (IEEE) 1394 specification, although the scope of the claimed subject matter is not limited in this respect.

Although the claimed subject matter has been described with a certain degree of particularity, it should be recognized that elements thereof may be altered by persons skilled in the art without departing from the spirit and/or scope of the claimed subject matter. It is believed that the subject matter pertaining to shapes comprising repeated graphic elements and/or many of its attendant advantages will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    defining a shape of an object to be rendered via a computing platform;
    determining one or more axes of the shape via said computing platform;
    determining one or more centers with respect to the one or more axes via said computing platform; and
    placing a graphical element in repeated positions corresponding to the one or more centers according to at least one selected parameter.

2. A method as claimed in claim 1, wherein the at least one selected parameter comprises at least one of distance from the one or more axes, size of the graphical element, density of the repeated positions of the graphical element, opacity of the graphical elements, type of the graphical element, rotation of the graphical element, pattern of the graphical element, position of the graphical element in one or more of the repeated positions with respect to a border of the shape, and/or an overlap of the graphical element for one or more of the repeated positions.

3. A method as claimed in claim 1, further comprising hiding the one or more axes of the shape via said computing platform.

4. A method as claimed in claim 1, further comprising hiding one or more borders of the shape via said computing platform.

5. A method as claimed in claim 1, the shape comprising at least one letterform.

6. A method as claimed in claim 1, the shape comprising one or more letterforms in a text, wherein the text remains editable text after said placing.

7. A method as claimed in claim 1, wherein said determining one or more axes is based at least in part on a Pavlidis type definition of the one or more axes.

8. A method as claimed in claim 1, wherein said determining one or more axes is based at least in part on a Voronoi type diagram.

9. A method as claimed in claim 1, wherein one of the one or more axes of the shape comprises a medial axis.

10. A method as claimed in claim 1, wherein one or more of the axes of the shape comprises an axis disposed at an offset with respect to one or more borders of the shape.

11. An apparatus, comprising:
    means for defining a shape of an object to be rendered;
    means for determining one or more axes of the shape;
    means for determining one or more centers with respect to the one or more axes; and
    means for placing a graphical element in repeated positions corresponding to the one or more centers according to at least one selected parameter.

12. An apparatus as claimed in claim 11, wherein the at least one selected parameter comprises at least one of distance from the one or more axes, size of the graphical element, density of the repeated positions of the graphical element, opacity of the graphical elements, type of the graphical element, rotation of the graphical element, pattern of the graphical element, position of the graphical element in one or more of the repeated positions with respect to a border of the shape, and/or an overlap of the graphical element for one or more of the repeated positions.

13. An apparatus as claimed in claim 11, further comprising means for hiding the one or more axes of the shape.

14. An apparatus as claimed in claim 11, further comprising means for hiding one or more borders of the shape.

15. An apparatus as claimed in claim 11, the shape comprising at least one letterform.

16. An apparatus as claimed in claim 11, the shape comprising one or more letterforms in a text, wherein the text remains editable text after said means for placing places the graphical element in repeated positions with respect to the one or more axes according to at least one selected parameter.

17. An apparatus as claimed in claim 11, wherein said means for determining one or more axes of the shape utilizes a Pavlidis type definition to determine the-one or more axes.

18. An apparatus as claimed in claim 11, wherein said means for determining one or more axes of the shape utilizes a Voronoi type diagram to determine the-one or more axes.

19. An apparatus as claimed in claim 11, wherein one of the one or more axes of the shape comprises a medial axis.

20. An apparatus as claimed in claim 11, wherein one or more of the axes of the shape comprises an axis disposed at an offset with respect to one or more borders of the shape.

21. An article comprising a storage medium having stored thereon instructions that, if executed by a computer, are adapted to enable said computer to:

define a shape of an object to be rendered;

determine one or more axes of the shape;

determine one or more centers with respect to the one or more axes; and place a graphical element in repeated positions corresponding to the one or more centers-according to at least one selected parameter.

22. An article as claimed in claim 21, wherein the at least one selected parameter comprises at least one of distance from the one or more axes, size of the graphical element, density of the repeated positions of the graphical element, opacity of the graphical elements, type of the graphical element, rotation of the graphical element, pattern of the graphical element, position of the graphical element in one or more of the repeated positions with respect to a border of the shape, and/or an overlap of the graphical element for one or more of the repeated positions.

23. An article as claimed in claim 21, wherein the instructions, if executed by said computer, are further adapted to enable said computer to hide the one or more axes of the shape.

24. An article as claimed in claim 21, wherein the instructions, if executed by said computer, are further adapted to enable said computer to hide a border and/or borders of the shape.

25. An article as claimed in claim 21, the shape comprising at least one letterform.

26. An article as claimed in claim 21, the shape comprising one or more letterforms in a text, and wherein the text remains editable text after said placing.

27. An article as claimed in claim 21, wherein determination of said one or more axes is based at least in part on a Pavlidis type definition of the one or more axes.

28. An article as claimed in claim 21, wherein determination of said one or more axes is based at least in part on a Voronoi type diagram.

29. An article as claimed in claim 21, wherein one of the one or more axes of the shape comprises a medial axis.

30. An article as claimed in claim 21, wherein one or more of the axes of the shape comprises an axis disposed at an offset with respect to one or more borders of the shape.

31. A method, comprising:

defining a shape of an object to be rendered via a computing platform;

determining one or more axes of the shape via said computing platform; and placing a graphical element in repeated positions with respect to the one or more axes according to at least one selected parameter via a computing platform, wherein said determining is based at least in part on a Pavlidis type definition of the one or more axes.

* * * * *